United States Patent Office.

CHARLES VOLKMAR AND HENRY VOLKMAR, OF BALTIMORE, MARYLAND, ASSIGNORS TO GEO. P. STEINBACH, OF SAME PLACE.

IMPROVEMENT IN ARTIFICIAL SCHOOL-SLATES.

Specification forming part of Letters Patent No. 44,921, dated November 1, 1864.

*To all whom it may concern:*

Be it known that we, CHARLES VOLKMAR and HENRY VOLKMAR, of the city and county of Baltimore, and State of Maryland, have invented certain new and useful Improvements in Artificial School-Slates; and we do hereby declare that the following is a full, clear, and exact description of the composition and manufacture of the same.

Our invention consists in applying certain mixtures of benzine or spirits of turpentine, japan, emery, flour, and coloring material to prepared pasteboard, by which an excellent school-slate is obtained, which not only presents all the advantages of a natural slate, but which is not liable to break, and which can be manufactured at such a moderate price as hardly to exceed the price of the natural fragile slate.

To enable others skilled in the art to make and use our invention, we will proceed to describe the same in its details.

Common pasteboard of any composition may be used for this artificial slate, and therefore the cheapest pasteboard may be preferred. It is cut in pieces to suit the sizes of slate to be made, and is heated in a stove, so as to expel the air from its pores, thereby causing said pores to expand and to open. When in this state of expansion, heated rosin or any other resinous matter, wax, or coal-tar is applied to the surface in such quantities as to impregnate the heated pasteboard, but not to leave a surplus thereon. The rosin is then worked or pressed into the pasteboard by means of heated flat-irons or by passing it between heated rollers, and the pasteboard is thus rendered a water-tight or impervious material.

Equal parts of benzine or spirits of turpentine and japan are mixed with sufficient emery-flour, or similar hard substance of the finest description, to give to the mass a proper consistency for coating the pasteboard as above prepared therewith, and a sufficient quantity of lamp-black, coke, or other black coloring material is added to give it a black color.

The pasteboard, after having been prepared as above described, is coated with this mixture, and as it dries rapidly, the coating is repeated after each coat has dried until the required thickness has been applied, which is generally obtained by the application of three or four coats of the mixture. Before the last coat applied to the pasteboard has dried, a dry mixture of two parts of emery-flour to one part of lamp-black or coloring material may be applied, which is finely dusted over the slate, and rubbed in with a brush. By this process the slate will acquire a higher degree of finish and smoothness. Within eight or nine days the slate thus prepared becomes perfectly dry and suitable for use, and may then, if necessary, be still further smoothed with fine emery-paper.

As no costly material is employed in the manufacture of this slate, it can be made at a very low price, and in many instances cheaper than the natural or stone slate without having the disadvantage of breaking; nor does the material crack or peal off from the pasteboard, as it adheres firmly thereto.

Having thus fully described the nature of our invention, what we claim therein as new, and desire to secure by Letters Patent, is—

1. An artificial slate having for its base pasteboard which is prepared and coated substantially in the manner and for the purpose herein described.

2. The application of a mixture of benzine or spirits of turpentine, japan, emery-flour, and coloring material in the manufacture of artificial slate, substantially in the manner and for the purposes described.

CHARLES VOLKMAR.
      H. VOLKMAR.

Witnesses:
 ALLEN E. FORRESTER,
 JOHN THEOPHIL.